(12) United States Patent
Keyani et al.

(10) Patent No.: US 7,251,495 B2
(45) Date of Patent: Jul. 31, 2007

(54) COMMAND BASED GROUP SMS WITH MOBILE MESSAGE RECEIVER AND SERVER

(75) Inventors: Pedram Keyani, San Jose, CA (US); Shelly D Farnham, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 198 days.

(21) Appl. No.: 10/955,088

(22) Filed: Sep. 30, 2004

(65) Prior Publication Data

US 2005/0170856 A1 Aug. 4, 2005

Related U.S. Application Data

(60) Provisional application No. 60/541,567, filed on Feb. 4, 2004.

(51) Int. Cl.
*H04Q 7/20* (2006.01)
*H04M 3/42* (2006.01)
*H04B 7/00* (2006.01)
*H04B 1/38* (2006.01)

(52) U.S. Cl. ............... 455/466; 455/416; 455/518; 455/519; 455/563

(58) Field of Classification Search ............ 455/414.1, 455/414.3, 404.1, 73, 403, 466, 563, 416
See application file for complete search history.

(56) References Cited

U.S. PATENT DOCUMENTS

| 5,870,454 A | 2/1999 | Dahlen et al. |
| 6,246,871 B1 | 6/2001 | Ala-Laurila |
| 6,456,616 B1 | 9/2002 | Rantanen |

(Continued)

FOREIGN PATENT DOCUMENTS

GB 2327571 A 1/1999

(Continued)

OTHER PUBLICATIONS

European Search Report dated Sep. 14, 2005, mailed Sep. 21, 2005 for European Patent Application Serial No. 05100738, 4 pages.

(Continued)

*Primary Examiner*—Duc M. Nguyen
*Assistant Examiner*—Mazda Sabouri
(74) *Attorney, Agent, or Firm*—Amin, Turocy & Calvin, LLP

(57) ABSTRACT

Disclosed is a unique system and method that facilitate group communication using SMS text messaging and a plurality of SMS based commands. More specifically, the system and method make use of mobile communication devices such as mobile or cellular phones, smart phones, and/or PDAs which are equipped with SMS capabilities. Communication within a group of users can be accomplished in part by creating a text message and sending it to at least one communication server by way of at least one common access number. The communication server can analyze the message to determine the recipient group and broadcast the message to the members of the group in real-time or near real-time. Groups can be user-defined and managed dynamically by users using either a website interface or a mobile communication device interface at any time or anywhere. The communication server can be a suitably equipped mobile communication device or a separate server can be employed.

29 Claims, 11 Drawing Sheets

U.S. PATENT DOCUMENTS

| | | |
|---|---|---|
| 7,003,516 B2 * | 2/2006 | Dehlinger et al. ............. 707/5 |
| 2002/0165024 A1 * | 11/2002 | Puskala ....................... 463/40 |
| 2002/0173319 A1 * | 11/2002 | Fostick ....................... 455/466 |
| 2003/0041070 A1 * | 2/2003 | Thompson et al. ..... 707/103 R |
| 2003/0137415 A1 | 7/2003 | Thomson |
| 2003/0179863 A1 | 9/2003 | Wescott |
| 2004/0043778 A1 | 3/2004 | Zom et al. |
| 2004/0066925 A1 | 4/2004 | Rosera et al. |
| 2004/0176139 A1 * | 9/2004 | Wang ........................ 455/563 |
| 2004/0242246 A1 * | 12/2004 | Lee et al. ................... 455/466 |
| 2005/0020250 A1 * | 1/2005 | Chaddha et al. ......... 455/414.1 |
| 2005/0089006 A1 * | 4/2005 | Wang et al. ................ 370/349 |
| 2005/0113123 A1 * | 5/2005 | Torvinen .................... 455/519 |
| 2005/0288046 A1 * | 12/2005 | Zhao et al. ................. 455/466 |
| 2006/0040684 A1 * | 2/2006 | Ala-Luukko ................ 455/466 |

FOREIGN PATENT DOCUMENTS

| | | |
|---|---|---|
| WO | WO 02/060199 A | 8/2002 |

OTHER PUBLICATIONS

1rstMAIL: IM and Email from SMS, About1rstWap, http://www.1rstwap.com/members5.htm, 1999-2004, 2 pages, last viewed Jan. 10, 2005.

* cited by examiner

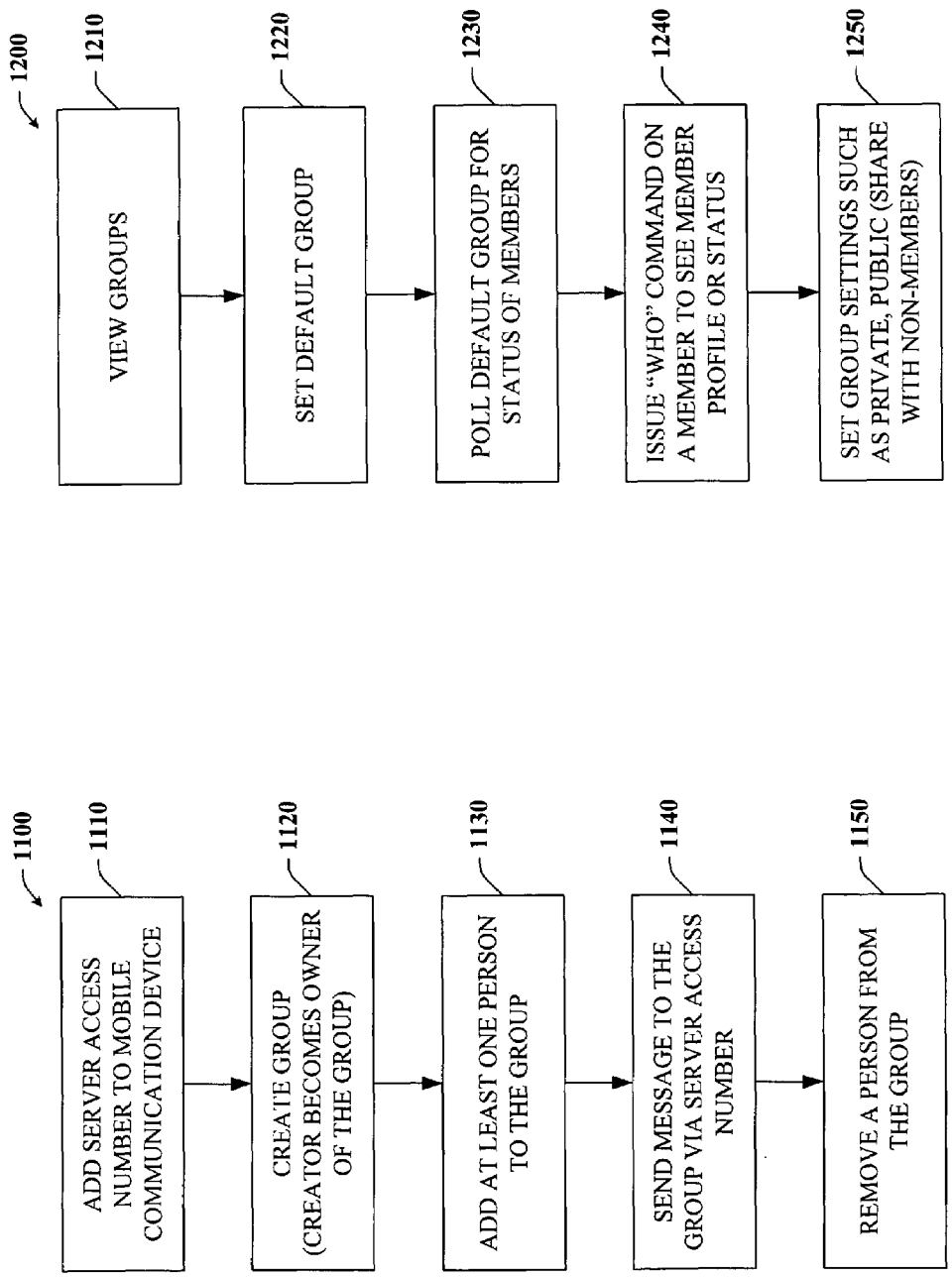

COMMAND BASED GROUP SMS WITH MOBILE MESSAGE RECEIVER AND SERVER

CROSS REFERENCE TO RELATED APPLICATION

This application claims the benefit of U.S. Provisional application Ser. No. 60/541,567, entitled COMMAND BASED GROUP SMS WITH CELLULAR PHONE MESSAGE RECEIVER AND SERVER and filed on Feb. 4, 2004, the entirety of which is incorporated herein by reference.

TECHNICAL FIELD

The invention relates generally to mobile communication and in particular, to mobile group messaging using short message service (SMS) technology to facilitate communication within groups of users.

BACKGROUND OF THE INVENTION

The last ten years has seen mobile phones revolutionize how people communicate, coordinate, and socialize. Mobile phones have become an integral part of the feeling of connectedness that friends and family share with one another, allowing them to keep in touch regardless of location. While voice communication is highly natural and expressive, it also requires immediate attention, occasional privacy, quiet surroundings, and does not scale well for coordinating within medium/large groups of people.

Text messaging, also know as SMS (Short Message Service), is a lightweight text communication tool for mobile phones. As the name implies, messages are very short, limited to 160 characters for most encoding schemes. SMS allows one person with an SMS-enabled phone to send a text message to another person with an SMS-enabled phone. SMS-enabled phones are in widespread use in Europe and Japan and gaining acceptance in the United States.

Despite the many advancements of mobile phone technology, communicating with more than one person at a time can be cumbersome, time consuming, and/or inconvenient particularly when dealing with time-sensitive information. Furthermore, with all the social uses of mobile phones, text messaging in its basic form lacks any features to support social coordination among a group of friends.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The invention relates to a system and methodology that facilitate SMS command based communication among and/or within a group of friends, colleagues, relatives, and the like. In particular, the systems and methods of the invention allow an SMS-enabled mobile phone user to send a text message for broadcast to a user-defined group by way of a communication server. The communication server receives the user's message and then distributes the text message to all recipients of any one group designated in the user's message. In addition to sending messages at any time or location for group broadcast, user-defined groups can be managed via the user's mobile phone at any time or at any location. Thus, they can be updated dynamically at the convenience of the user and as interactions between the user and a particular group fluctuates. As a result, communication between individuals in the group can be performed with greater ease and efficiency compared to conventional approaches.

In accordance with one aspect of the invention, a communication server can be employed to broadcast text messages from the sender to a group identified to receive the message. More specifically, a user or group member (e.g., sender) sends a text message to a server's access number. The message can be marked for delivery to a group named Group ABC, for example. Group ABC can include a plurality of people identified by their respective call names and/or mobile phone numbers as set by the user. When the user sends the message, the message can actually be sent directly to the communication server—rather than to each desired individual recipient one at a time (e.g., create message and send to recipient A; create message again and send to recipient B, etc.). The communication server can analyze the group indicated in the message and determine the proper recipient group (e.g., recipients) of the message. For instance, the communication server can recognize the recipient group and then access the members' phone numbers or other relevant information from one or more databases. After retrieving the necessary data, the communication server can broadcast the message to the members of the group in real-time or near real-time. Responses to the message can be handled in a similar manner.

According to another aspect of the invention, a smart phone can operate as the communication server to facilitate making group communication completely mobile among users. The smart phone can host one or more user groups and maintain application information, logs, and/or data persistence to support dynamic group SMS based messaging-which would otherwise be maintained by a separate server. Thus, dependence on additional hardware as well as associated usage costs can be substantially reduced.

To further enhance the mobile group communication experience, group management can be performed directly from the user's SMS enabled mobile phone. More specifically, user-defined groups of friends, relatives, colleagues, game players, project participants, or any other social group, for example, can be created and/or managed on each user's mobile phone using SMS based command language. Thus, user-defined groups can be modified dynamically as a user's social or business situation changes, thereby making the user more adaptable to frequent changes in every day situations. Alternatively, such groups can be maintained via a smart phone interface or a website interface.

In addition to supporting ongoing conversations or exchanges of messages, the user's mobile or smart phone can be employed to access or view communication logs without installing additional hardware or software on the phone or other mobile communication device. Alternatively, previous or current logs can be obtained by way of the website interface.

According to still another aspect of the invention, the most current status of any member of a group can be determined by polling the group or by polling specific members or users. For instance, polling for a user's status can provide information such the user's last broadcasted message, user's idle time, whether user's phone is turned on or off or is out of reach, and/or the user's stated status (e.g., "call me", "asleep", "busy", "meeting", "can't text now", "back in _ minutes").

Moreover, the invention provides group-based text messaging systems and methods that allow for time- and location- independent "always on" group awareness and communication capabilities. User-defined groups can be multifaceted and dynamic, changing constantly depending on a particular user's current set of circumstances. As a result, the invention allows users to easily create and alter multiple groups to match the social or business groups in their lives at any given time or location.

To the accomplishment of the foregoing and related ends, certain illustrative aspects of the invention are described herein in connection with the following description and the annexed drawings. These aspects are indicative, however, of but a few of the various ways in which the principles of the invention may be employed and the invention is intended to include all such aspects and their equivalents. Other advantages and novel features of the invention may become apparent from the following detailed description of the invention when considered in conjunction with the drawings.

BRIEF DESCRIPTION OF THE DRAWINGS

FIG. 11 is a flow chart illustrating an exemplary sequence of events that facilitates group management in accordance with an aspect of the invention.

FIG. 12 is a flow chart illustrating an exemplary sequence of events that can be employed in accordance with an aspect of the invention.

DETAILED DESCRIPTION OF THE INVENTION

Figure 1:
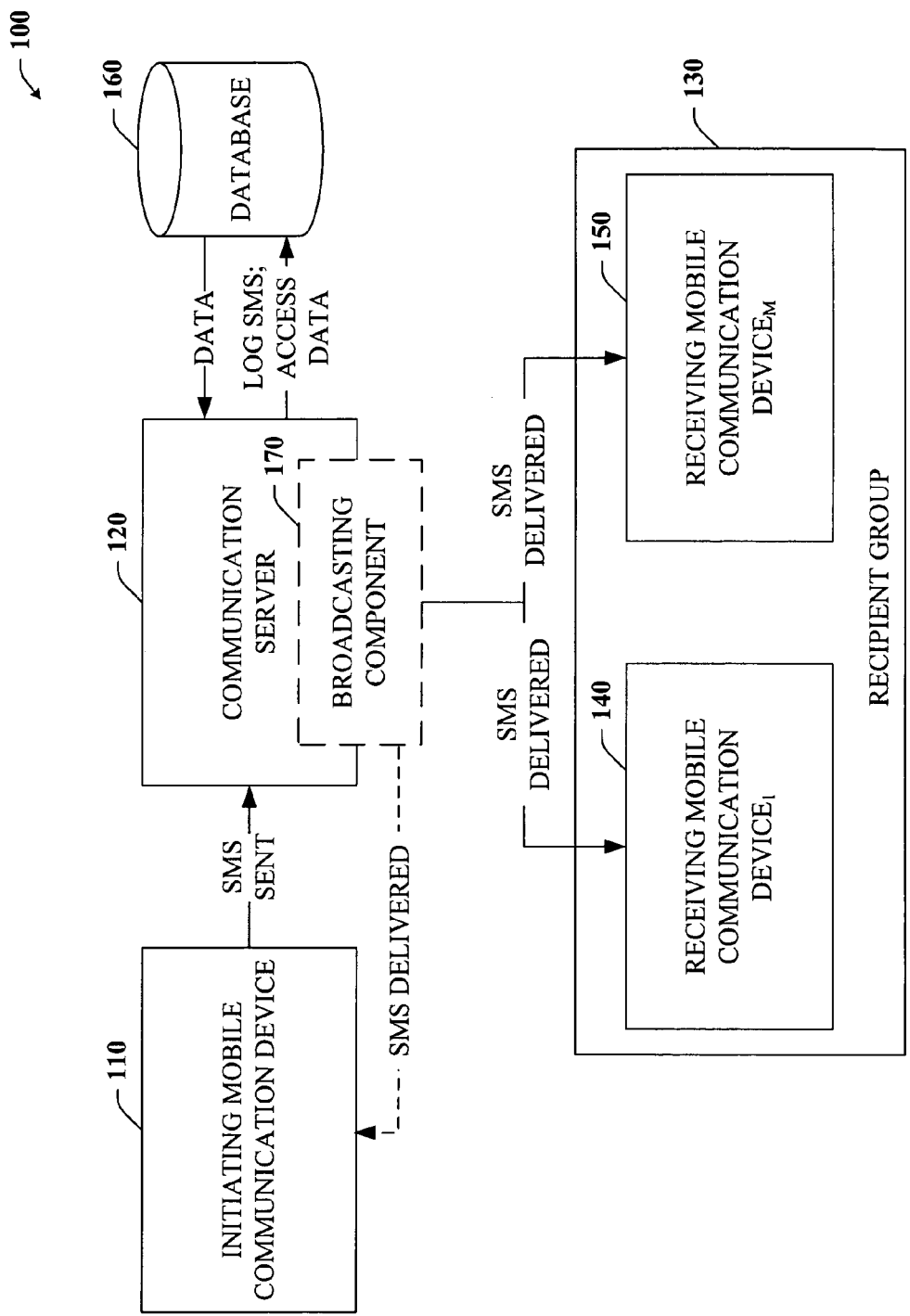
FIG. 1 is a high-level block diagram of a group SMS mobile messaging system in accordance with an aspect of the invention.

The invention is now described with reference to the drawings, wherein like reference numerals are used to refer to like elements throughout. In the following description, for purposes of explanation, numerous specific details are set forth in order to provide a thorough understanding of the invention. It may be evident, however, that the invention may be practiced without these specific details. In other instances, well-known structures and devices are shown in block diagram form in order to facilitate describing the invention.

As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and a computer. By way of illustration, both an application running on a server and the server can be a component. One or more components may reside within a process and/or thread of execution and a component may be localized on one computer and/or distributed between two or more computers.

The subject invention can incorporate various inference schemes and/or techniques in connection with determining a default group based at least in part upon previously sent or received messages and/or determining a recipient group of a particular message based at least in part on the text of the message. As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

The invention as described with respect to the figures below relates to a group-based text messaging system that facilitates peripheral social awareness and smart convergence. The invention combines the advantages of text messaging such as the real-time factor and micro-coordination capabilities with the advantages of broadcasting messages to a group rather than to individual recipients one at a time to facilitate planning among a group of people. Unlike conventional text messaging systems, the command language allows users to manage their group communication from anywhere at any time with their SMS enabled mobile or smart phone in hand. As social situations fluctuate, users can readily update their groups dynamically.

As will be discussed in more detail below, any user may serve or host a group from his/her own suitably equipped phone. Thus, the costs associated with group communication can be restricted to the "owner" (host) of the group. More importantly, though, creating or maintaining a group in accordance with the subject invention does not require the presence of any other server. However, a separate and/or additional server can be employed.

Referring now to FIG. 1, there is a general block diagram of a group SMS mobile messaging system 100 in accordance with an aspect of the invention. The messaging system 100 includes an initiating mobile communication device 110 such as a mobile phone, PDA (personal digital assistant), or smart phone. The initiating mobile communication device 110 can communicate with a group by sending a text message to a communication server 120. The communication server 120 can interact with the initiating device by way of a serial port connection or a wireless connection. More specifically, the initiating device 110 can call or otherwise signal the server 120 to receive data (e.g., text message, new user name, etc.) from the device 110. For example, the server 120 can be assigned at least one access number. When communication server 120 receives the data, it can parse the data for commands to determine how to handle the accompanying information.

For instance, when a text message is received by the communication server 120, the server 120 can analyze the command language accompanying the message to identify or determine an appropriate recipient group 130 of the message. In practice, imagine that group members (e.g., 140, 150) are identified by a user name or nickname on the mobile device interface. The server 120 can access the specific group members' corresponding phone numbers or any other pertinent information from a database 160 and set the message for broadcast to only that group.

Once the group and its members are properly identified, a broadcasting component 170 operatively connected to the communication server 120 can be employed to deliver or distribute the text message to the different members of the group 130 by way of their respective receiving mobile communication devices (e.g., RECEIVING COMMUNICATION DEVICE$_1$ 140 up to and/or including RECEIVING COMMUNICATION DEVICE$_M$ 150, where M is greater than or equal to one). Examples of receiving mobile communication devices include but are not limited to mobile phones, smart phones, PDAs, and any other handheld or mobile communication device that are capable of receiving text messages. It should be appreciated that the communication server 120 can also create and/or update message logs by storing to the database 160 each message broadcasted per group for later viewing.

In addition to broadcasting text messages to group recipients, the communication server 120 can facilitate creating or managing groups for any user. Data germane to group management (e.g., create, edit, modify, remove, poll, etc.— as applied to a group or individual member of a group) can also be parsed and manipulated by the server 120 when accompanied with the appropriate command language. For instance, a user can send a request to the communication server to create a new group or ascertain the status of an existing group by providing the appropriate commands. The server can process the commands that it recognizes and then can carry them out accordingly.

Table 1 below describes at least a portion of the commands that can be used to perform or manage group communication as discussed in the invention:

TABLE 1

GROUP COMMUNICATION COMMAND LANGUAGE

| Command | Messaging System Response |
| --- | --- |
| Add <name> (<number>) (to <group>) | Adds a current or new friend to a specified group or to the default group |
| Create group <group> | Creates a new group |
| Edit name <name> | Changes username in system |
| Give <name> <group> | Makes <name> co-owner of <group> |
| <group> on or off | Turns a group on or off for message reception |
| Help (<command>) | Returns general help on using system or detailed help for a specified command |
| Poll (<group>) | Returns the status of friends in a group or the default group |
| Remove <person> (from <group>) | Will remove a particular person, group or person from a specific group |
| Remove <group> | |
| Status <personal status message> | Sets a status message |
| Who <group> | Returns the list of people in a group or the name, number and status of a specific friend |
| Who <name> | |
| (<group>) <broadcast message> | Broadcasts a message to a particular group or the default group | xyz: x is a shortcut for the command xyz
(x): x is an optional part of the command
<x>: x is a user defined field In one approach, creating a group can be accomplished at least in part by issuing the command "create <group>". Once the group has been created, the user can add one or more persons to this group by issuing the command "add <name> <number> to <group>". Individuals can also be removed from the group through the command "remove <name> from <group>". Entire groups can be deleted as well by issuing the command "remove <group>".

Broadcasting or sending a message to a group can be performed by sending the following to the communication server 120: "(<group>) <message>". The first word (<group>) is the name of a particular group that the sender belongs to, followed by the content of the message. If the sender maintains only one group, then any message sent to the communication server 120 by the sender can be sent to that particular group by default. Hence, the sender would not need to specify or identify the group in the command. The message can automatically be broadcasted to the members of the sender's default group.

Moreover, any group can be set as the default group either manually by the user or automatically by observing the user's communications with a particular group. In the latter scenario, the default group setting can be changed when the server observes a number of messages sent to and/or received from a particular group such as over a period of time (e.g., 2, minutes, 5 minutes, 15 minutes, etc.). Hence, the server can include an artificial intelligence component (not shown) to facilitate making such inferences or determinations based on learned or observed user or group behavior.

Additionally, artificial intelligence can also be employed to facilitate automatically identifying the appropriate group for the sender's message. In one approach, the artificial intelligence component can learn that when certain key words or phrases are included in the message, then those likely are intended for a particular group. For example, business related words, abbreviations, or phrases such as product, net gain, reports, invoices, and the like can be learned to indicate the group named Business. The sender can be asked to verify that the Business group is the intended recipient of the message.

Figure 2:
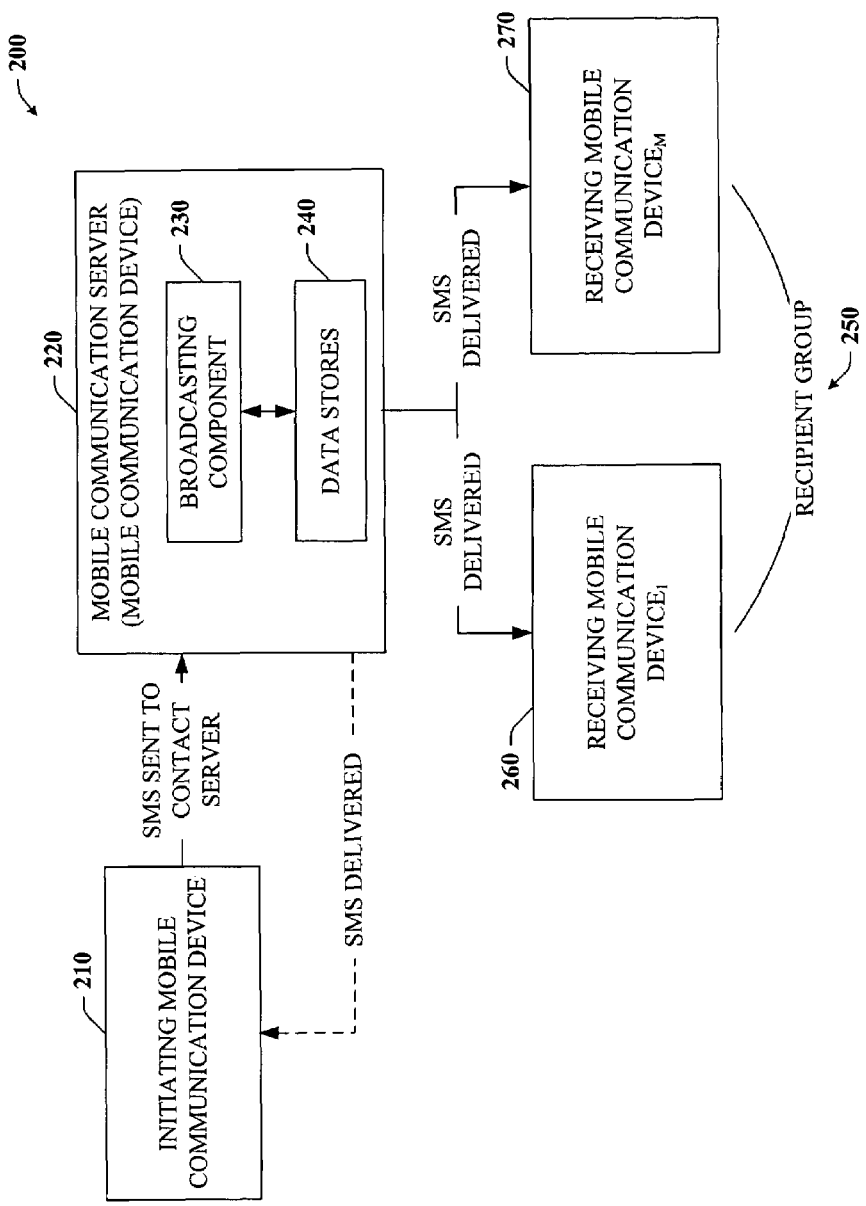
FIG. 2 is a high-level block diagram of a group SMS mobile messaging system in accordance with an aspect of the invention.

Turning now to FIG. 2, there is illustrated a group SMS mobile communication system 200 that makes use of a mobile communication server 220. The system 200 is similar to the system 100 (FIG. 1, supra) in that it includes an initiating mobile communication device 210 such as a smart phone, mobile phone, or PDA that can communicate with a group of mobile device users by sending a text message to the group. However, unlike the system 100 in FIG. 1, the system 200 makes use of a smart phone or other suitably equipped mobile device 220 to operate as the server (mobile communication server 220) for one or more groups of users.

The mobile communication server 220 includes a broadcasting component 230 that can store and retrieve relevant data from one or a plurality of data stores 240 to determine the appropriate recipients of the text message. Following, the text message can be broadcasted to the respective receiving mobile communication devices 250 associated with the group (e.g., MOBILE COMMUNICATION $DEVICE_1$ 260 up to and/or including MOBILE COMMUNICATION $DEVICE_P$ 270, where P is greater than or equal to one). Moreover, the owner of the mobile contact server 220 effectively maintains control over the group(s) he/she is serving. Thus, the owner can decide when the can interact with the mobile contact server 220 and thus between members of the group through the group. It should be appreciated that the mobile device operating as a server to the one or more groups can also be a member of one or more of the groups. All group members receive the broadcasted message—including the group member who sent the message.

Figure 3:
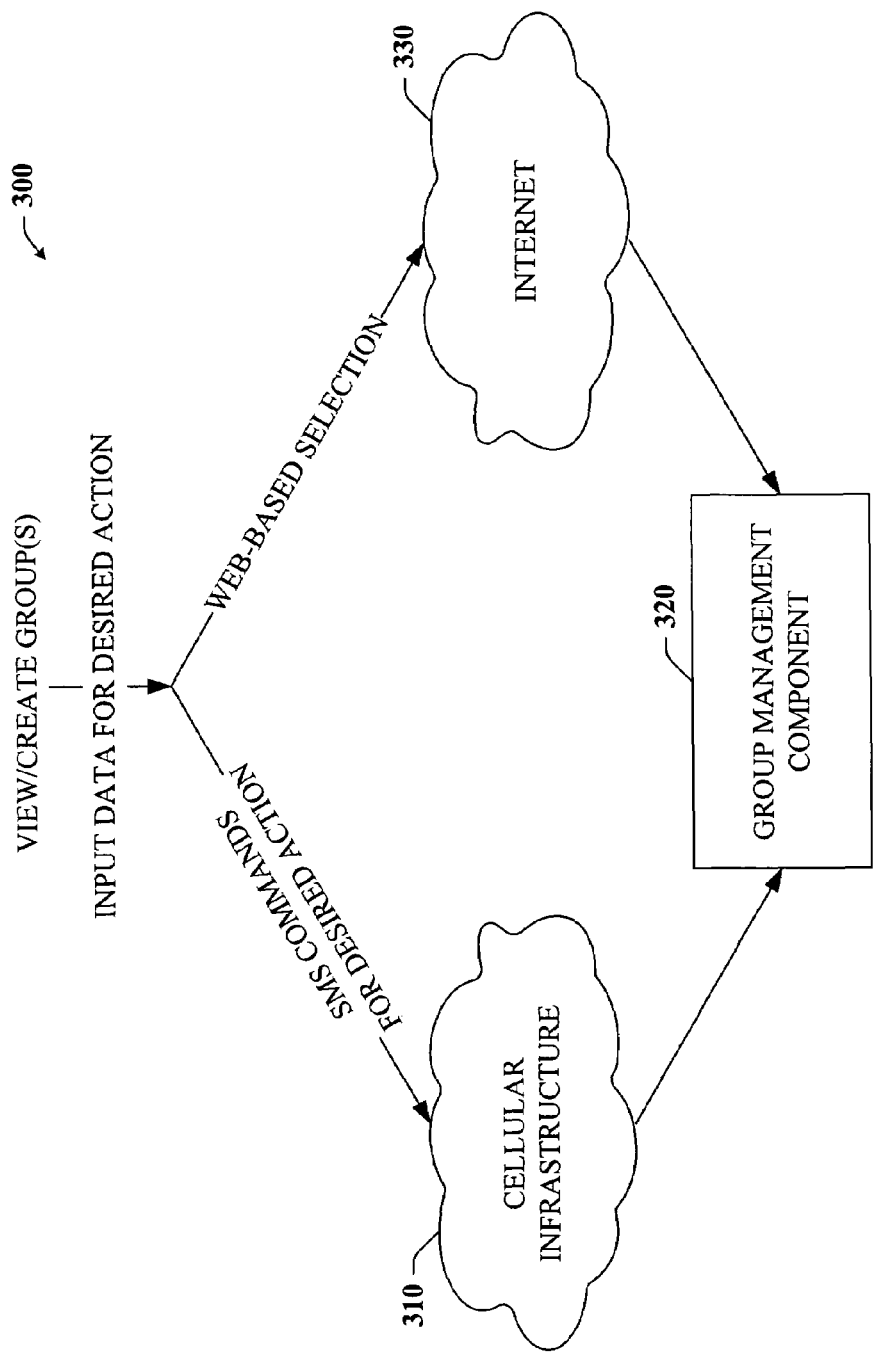
FIG. 3 is a schematic block diagram of a user-defined group management system in connection with group SMS mobile messaging according to an aspect of the invention.

Referring now to FIG. 3, there is illustrated a block diagram of a group management sub-system 300 that can be incorporated into the mobile communication systems 100 and 200 of FIGS. 1 and 2, respectively. The group management sub-system 300 can facilitate user maintenance or creation of groups either through a web interface or mobile phone interface, or both. For example, when viewing or creating groups is desired, the appropriate data can be entered along with the corresponding command. On a mobile phone interface, for instance, SMS commands can be employed to carry out the user's desired action. The command and requisite data can be transmitted or otherwise communicated via a cellular infrastructure 310 and then to a group management component 320 to obtain the desired result. Similarly, when interacting with the web interface, the user can make use of the appropriate web-based selection components (e.g., buttons) to communicate with the group management component 320 via the Internet 330.

The cellular infrastructure 310 can include any number or combination of different networks or service providers that are interoperable and compatible with each other. Once a group host has been set up, other users can start using it without the installation of any other programs on their mobile devices.

Figure 4:
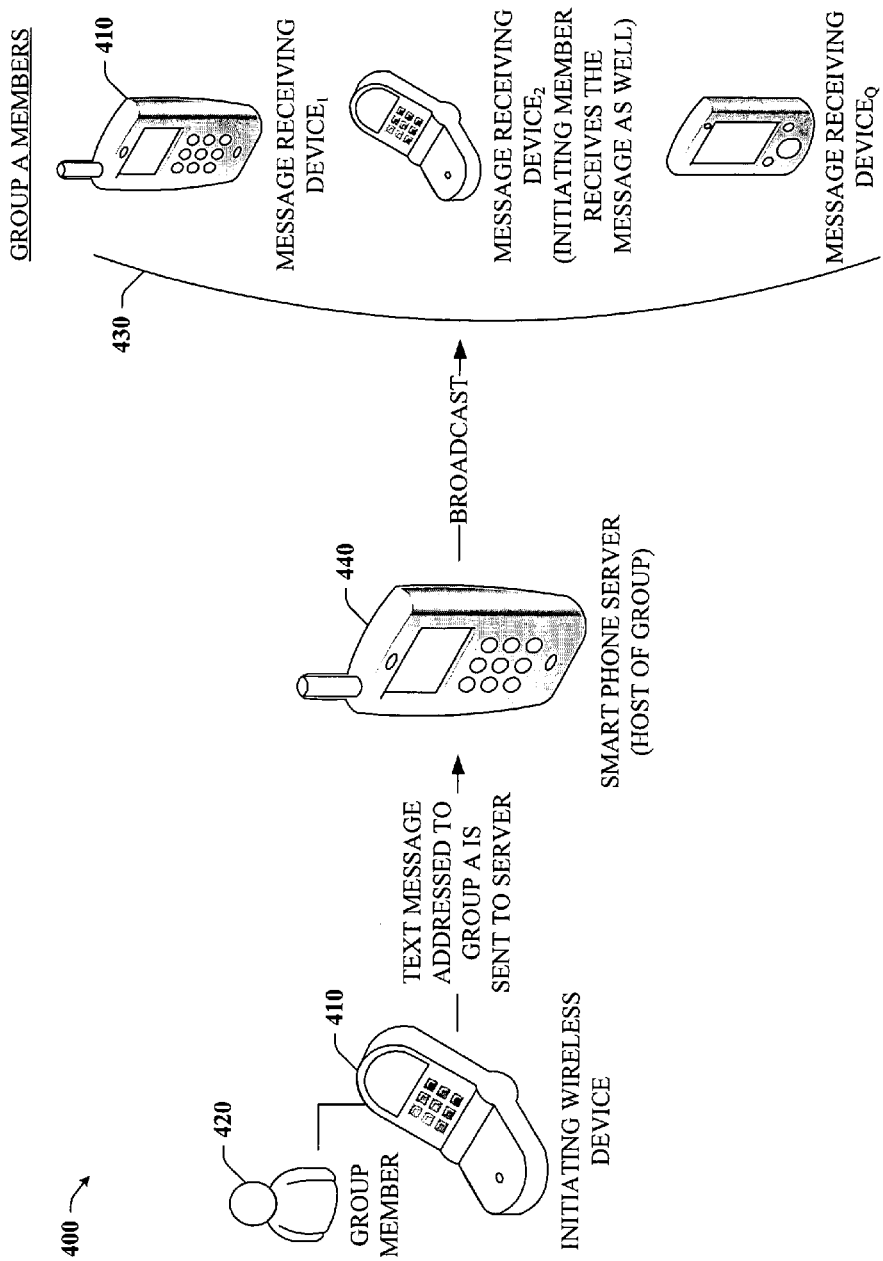
FIG. 4 is a schematic diagram demonstrating an exemplary architecture for a group SMS mobile messaging system in accordance with an aspect of the invention.

Turning now to FIG. 4, there is illustrated a schematic diagram demonstrating an exemplary architecture 400 of the group SMS mobile communication system 200 as discussed in FIG. 2, supra. The architecture 400 includes an initiating wireless or mobile communication device 410 that is operated by a group member 420. Imagine that the group member 420 would like to send a text message to Group A 430 to update their meeting time and location. To do so, the group member 420 addresses the message to Group A and then sends it to a communication server 440—which can be a smart phone, as is the case in this figure, or some other suitably equipped communication device. The server 440 processes and analyzes the message to determine where and to whom to send it to and then broadcasts the message only to the specified group. The specified group can be explicitly included in the message or can be a learned or default group. The default group receives the message if no other group is explicitly indicated in the command line. Following, Group A members receive the broadcasted message. If one of the members' devices happens to be turned off during the broadcast, the message appears as soon as the device is turned on or activated to receive messages.

Figure 5:
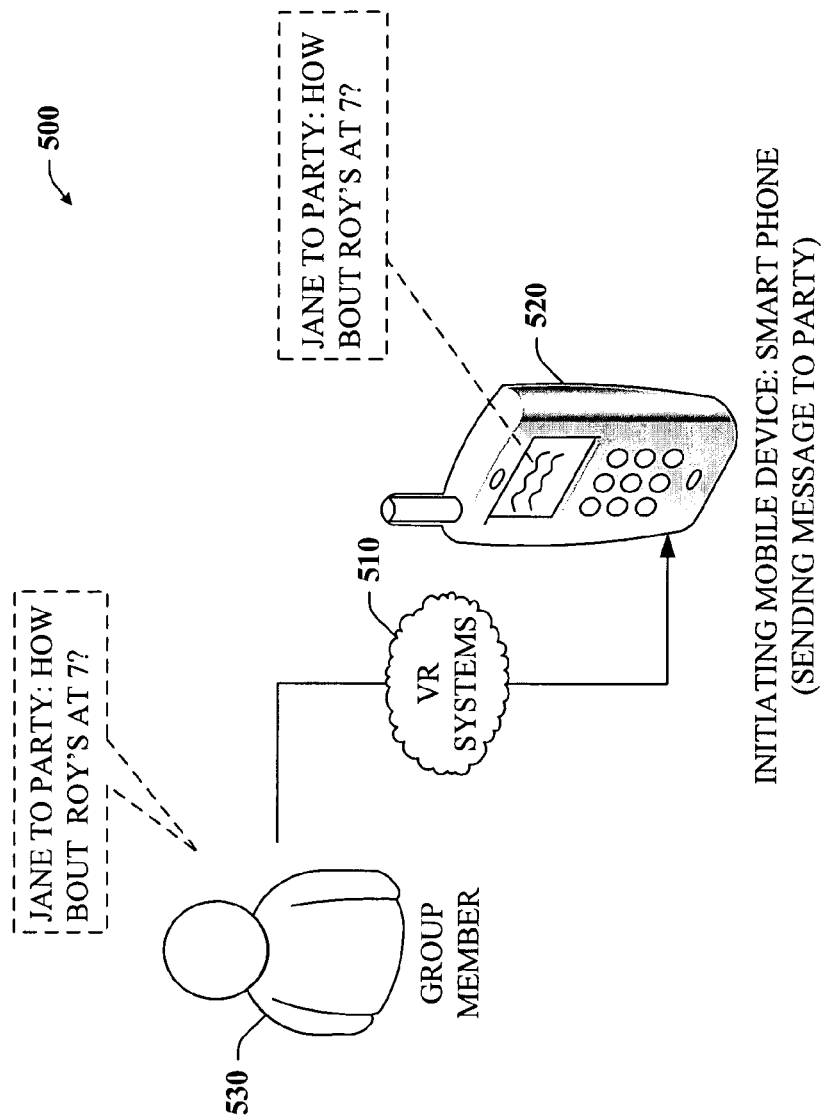
FIG. 5 is a schematic diagram demonstrating the incorporation and use of voice recognition systems to create text messages for group communication in accordance with an aspect of the invention.

Creating text messages or messages in general for the communication—server to process and/or broadcast can be typed or verbally provided to the initiating mobile device 410 as depicted in the schematic diagram 500 in FIG. 5. For instance, voice recognition systems 510 can be integrated within an initiating mobile communication device 520. Thus, the user or sender (e.g., group member 530) can rather quickly create messages or readily manage his groups by speaking commands and any necessary information to perform the desired action. The corresponding text can be verified on-screen before the message is actually sent to the server (not shown) for processing and/or broadcast. For example, the member speaks "JANE TO PARTY: HOW BOUT ROY'S AT 7?" The screen on the mobile device 520 can then show the written version of the message for the member to verify before sending.

Figures 6, 7:
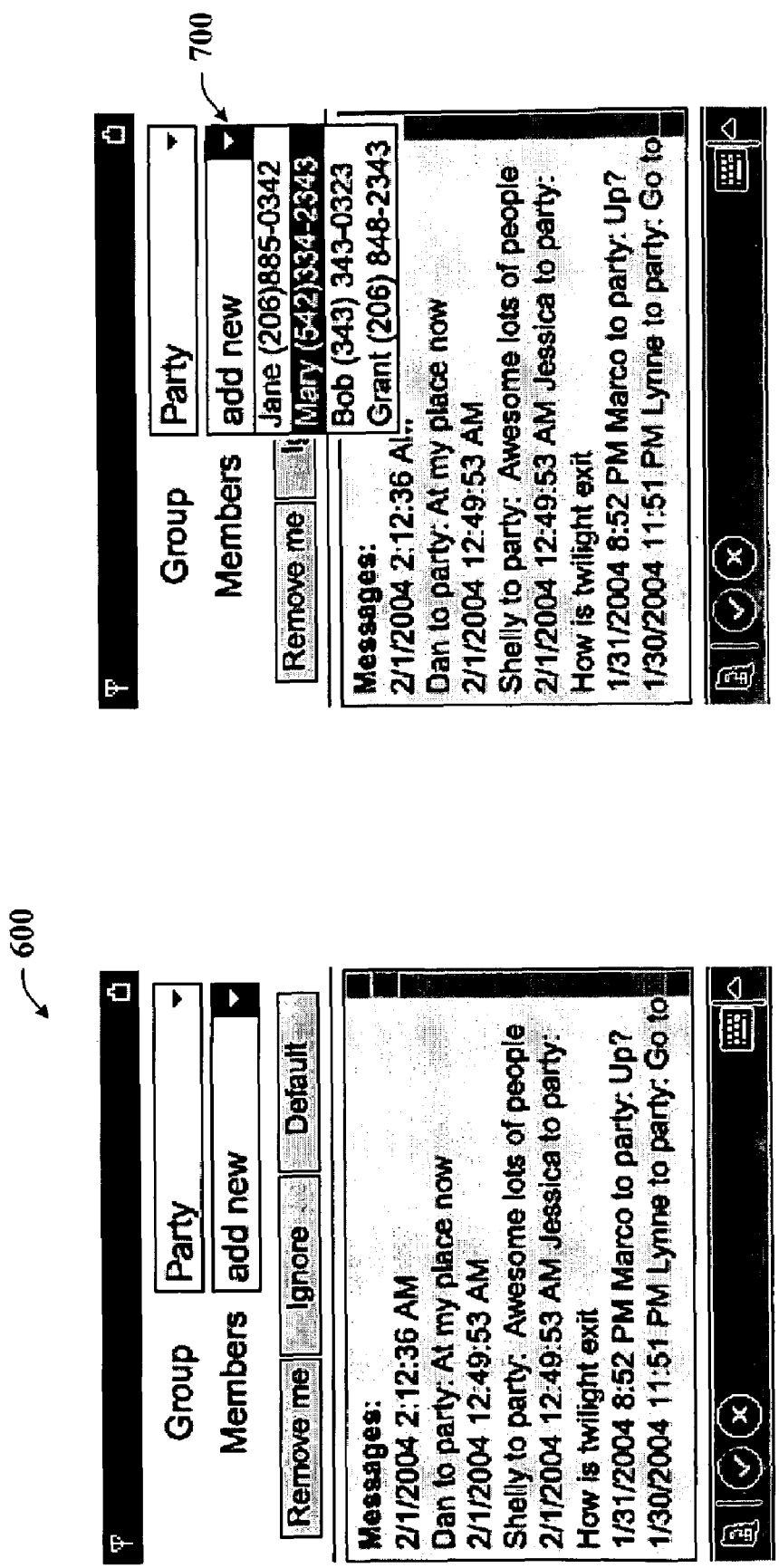
FIG. 6 is an exemplary user interface of a mobile phone during use of group SMS mobile messaging in accordance with an aspect of the invention.
FIG. 7 is an exemplary user interface of a mobile phone during use of group SMS mobile messaging in accordance with an aspect of the invention.

Referring now to FIGS. 6 and 7, there are illustrated two different views of exemplary user interfaces for group management on a mobile communication device in accordance with an aspect of the invention. In FIG. 6, user interface 600 demonstrates various kinds of information on display for the user. For example, the group name and list of members can be readily viewed. Additionally, a message log including the most recent exchange of messages between the group and named members of the group can be accessed and viewed as well. Selection buttons such as "remove me", "ignore", and "default" can also be provided to increase the efficiency of group management on the mobile device.

In FIG. 7, a list of members in each group can be viewed such as in the form of a drop-down list 700. As can be seen, each member of the group Party may be identified by user name and phone number. This can be helpful to members particularly when a member possesses more than one mobile communication device, each having a different phone number. Messages can be broadcasted to the members of the group using their respective phone numbers. According to the figure, new members can be added to each group by selecting "add new" from the drop down menu.

Figure 8:
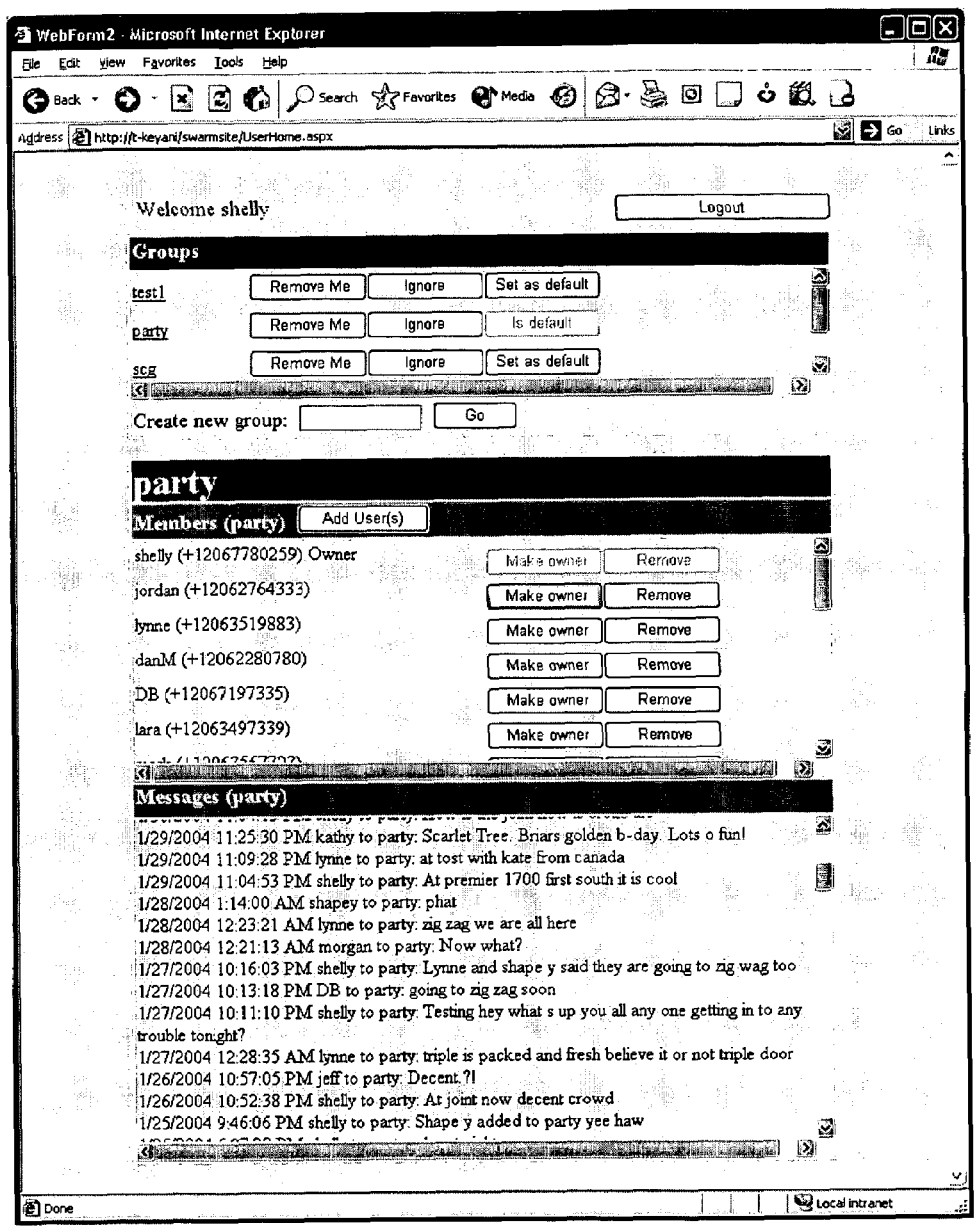
FIG. 8 is an exemplary web user interface that facilitates management of messaging groups in accordance with an aspect of the invention.

In addition to utilizing the mobile device user interface for group management, a web interface can be employed as well. FIG. 8 illustrates an exemplary web user interface 800 of a group management page for a particular user. As shown, the user's groups can be listed in any order. Details regarding the default group can be automatically shown such as the group's members and a corresponding message log for the group. It should be understood that older portions of the message log can be saved to an archives folder for more efficient storage. To view the details of another group, that group name can be selected by the user. Furthermore, a new default group can also be set simply by selecting the appropriate button. In addition, new groups can be created and current groups can be edited or modified as desired. For instance, a group's owner can be changed, members to an existing group can be added or removed, and their numbers or names can be modified as well.

Figure 9:
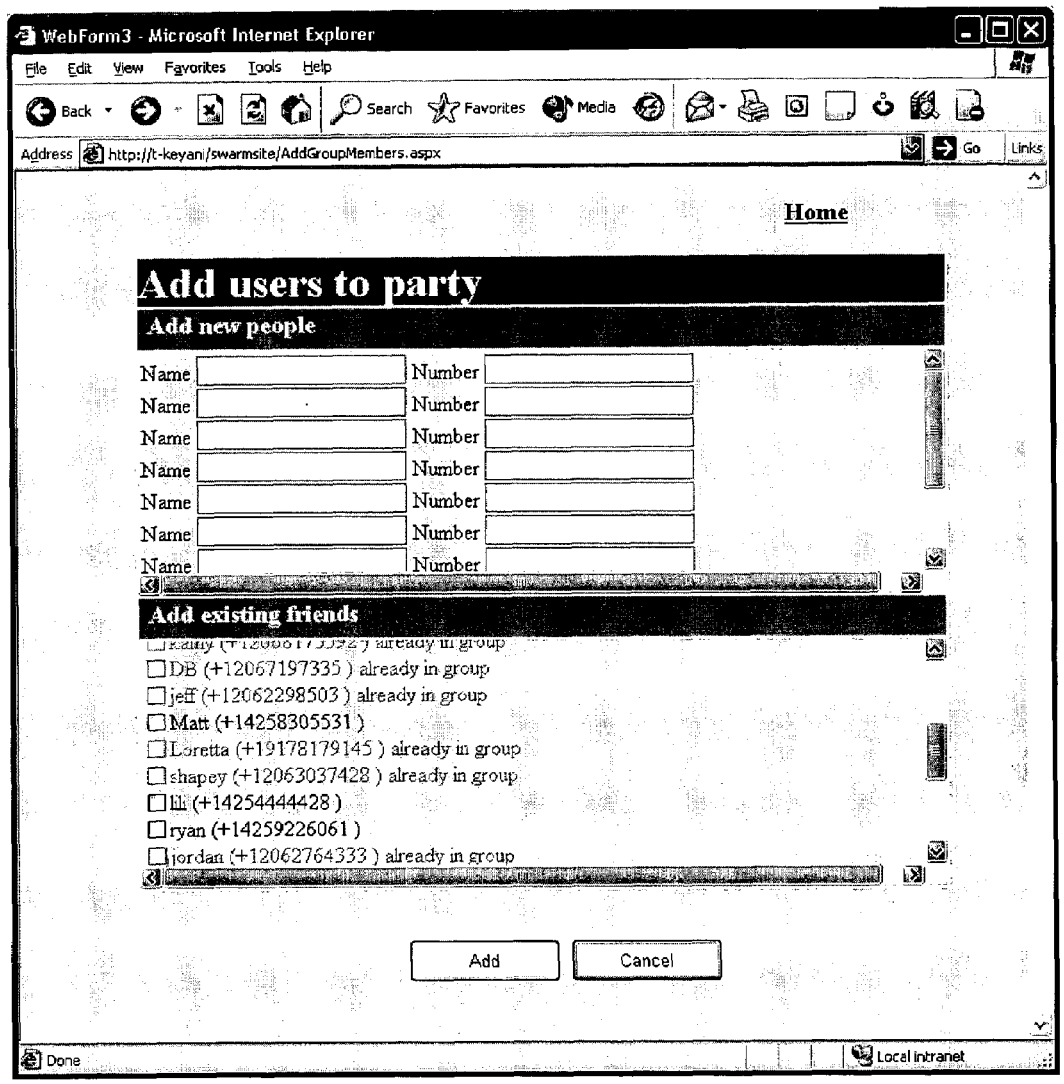
FIG. 9 is an exemplary web user interface that facilitates adding users to any particular user-defined group for group SMS messaging in accordance with an aspect of the subject invention.

FIG. 9 illustrates an exemplary web user interface 900 that assists a user in the process of adding new members to an existing group. New members can be chosen from a pool of existing contacts already stored in the user's account or by entering the name and number of the new member. Contact information of potential new members can also be searched via the Internet using the website interface 900.

Various methodologies in accordance with the subject invention will now be described via a series of acts, it is to be understood and appreciated that the invention is not limited by the order of acts, as some acts may, in accordance with the invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the invention.

Figure 10:
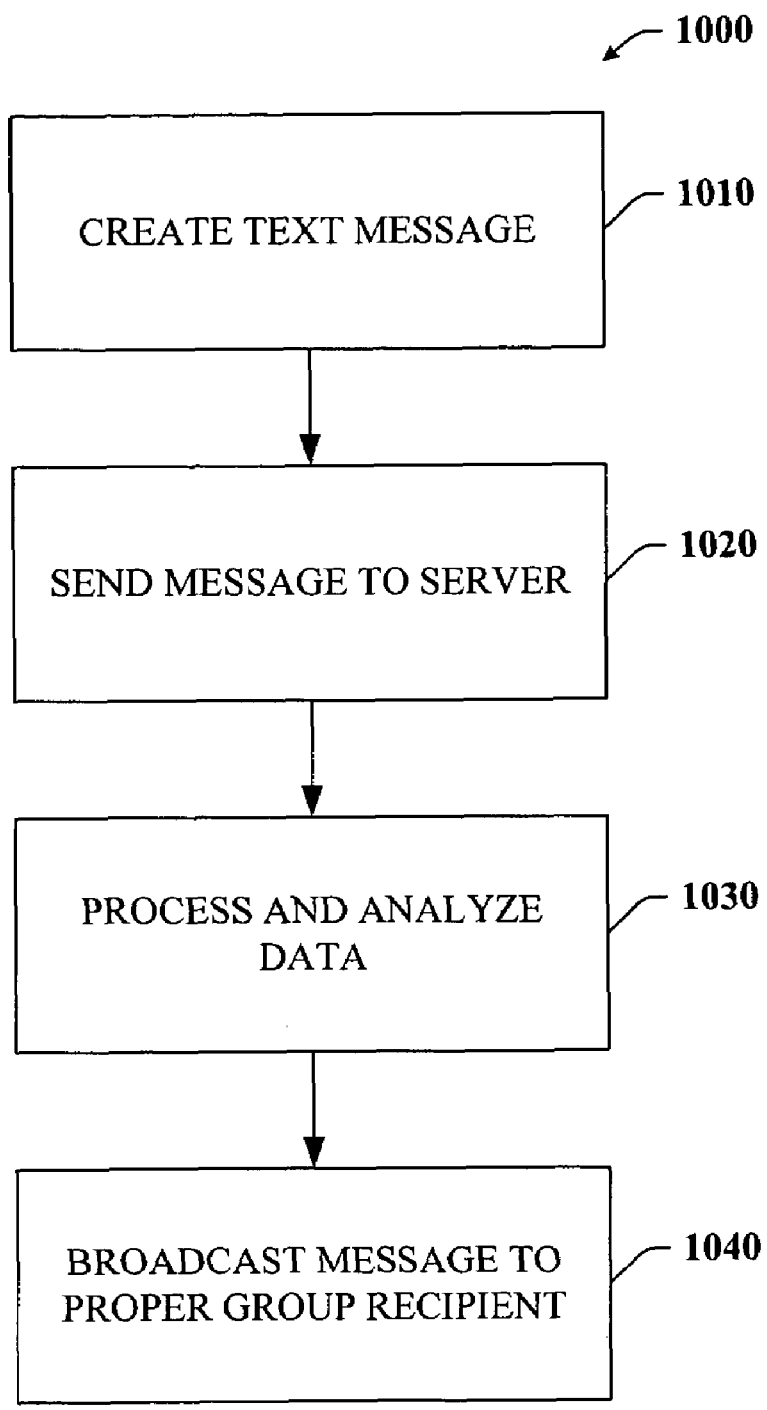
FIG. 10 is a flow chart illustrating an exemplary methodology for group SMS messaging in accordance with an aspect of the invention.

Referring now to FIG. 10, there is a flow diagram of an exemplary process 1000 that facilitates group SMS communication between mobile communication devices. The process 1000 involves creating a text message at 1010. The text message can be a brief note of information intended for a group of other people (e.g., "Meet at my place in 5 minutes") or can be information relating to managing the user's group(s) (e.g., "Betty 4258675309"). When sending a message to a group, the sender and the group name may be inserted automatically as a prefix to the message (e.g., FIG. 5, supra) to identify the author of the message as well as to confirm the recipient group of the message.

The text message can be created by striking the appropriate keys on the device's keyboard or can be spoken into the device and converted to text by a voice recognition system. Alternatively or in addition, the message can be written on the device screen and then converted to a type font by a handwriting recognition system.

At 1020, the message is sent to a server whereupon it can be processed and analyzed at 1030 to at least determine the members of the group. If no group is specified by the sender, then the server can identify the default group as the recipient group. If the sender has not selected a default group, then the server can employ an artificial intelligence component(s) to suggest or determine the appropriate recipient group based in part on the sender's behavior. Finally, at 1040, the server can broadcast the message to the proper recipient group. As a member of the recipient group, the sender can receive a copy of his/her own message to confirm that the message was successfully broadcasted by the server. Hence, the entire group receives the message.

Referring to FIG. 11, there is illustrated a flow diagram of an exemplary sequence 1100 of events that facilitates group management in accordance with an aspect of the invention. As described hereinabove, group communication via mobile devices involves interacting with a server or a wireless, mobile device acting as a server. Such interaction can be accomplished, for instance, by sending commands along with any pertinent data to the server. Thus, the sequence 1100 can begin with adding a server access number to a phone book or directory of a mobile communication device at 1110. Before gaining regular access to the server number, the user may be asked to set up an account or enter their phone number and a special password.

More than one server can be employed (e.g., server network), thus more than one access number can be used to balance the load of users among servers. Alternatively, one access number can be assigned to more than one server. When multiple servers are used, they can be arranged in a manner that allows communication between servers to coordinate incoming and/or outgoing information.

At 1120, a user can create one or more groups through a website interface (e.g., login required) and/or directly from their mobile communication device. The user becomes the owner of the group by default. However, the owner of the group can assign "owner" rights and privileges to other members of the group. Examples of owner rights and privileges include but are not limited to adding or removing members, controlling the group's receipt of messages (e.g., turning the group "on" or "off"), and the like. It should be understood that more than one member of a group can have owner rights.

At 1130, at least one person can be added to the group. At 1140, a message can be sent to the group (presumably by any member of the group); and at 1150, a member can be removed from the group—as desired by the group owner. When managing groups on the website interface (e.g., Internet), selection buttons are available to guide the user through the process. Similarly, when using a device such as a mobile phone, commands may be issued by selecting an appropriate button (e.g., soft keys) or by entering them manually. For example, the command "add <name> <number> to <group>" can be manually entered to add a new member to a particular group. If an "add" soft key is available, then selecting this key effectively issues the "add" command. When desired commands cannot be recalled by a user, the user can enter "help" to see a list of available commands.

Turning now to FIG. 12, there is illustrated a flow diagram of an exemplary sequence 1200 of events that can be employed in accordance with an aspect of the invention. For example, at 1210, a user can view his/her stored groups. At 1220, a default group can be chosen. When a recipient group is not indicated in a message, the default group receives the message. At 1230, the default group can be polled to ascertain the status of the members. When a member sends a message, his/her status is set to indicate that a message was sent in the last 24 hours, for example.

At 1240, a "who" command can be issued to view another member's profile. Alternatively, third party user groups can be accessed by the server and accordingly, can be responsive to "who" commands. For example, a user of the group communication system can issue a "who" command on a person registered with a buddy network named FriendNetwork to view the person's profile. Members of these third party networks can be made available to join or become members of groups within the group communication system.

Optionally, at 1250, a group owner can modify group settings such as by making the group public (e.g., non-members of the group can send messages to the public group) or private (e.g., members-only group). Thus, access to groups can be restricted to the group members or expanded beyond the group members.

Moreover, groups of users can more efficiently communicate with one another by interacting with a server or server network rather than by sending the same message separately to each individual recipient. Group communication using SMS technology can become truly mobile by employing a smart phone or other suitable mobile device as the host or server of the group. Thus, broadcasting of messages to a group can depend on the group members itself rather than on a separate server.

Figure 13:
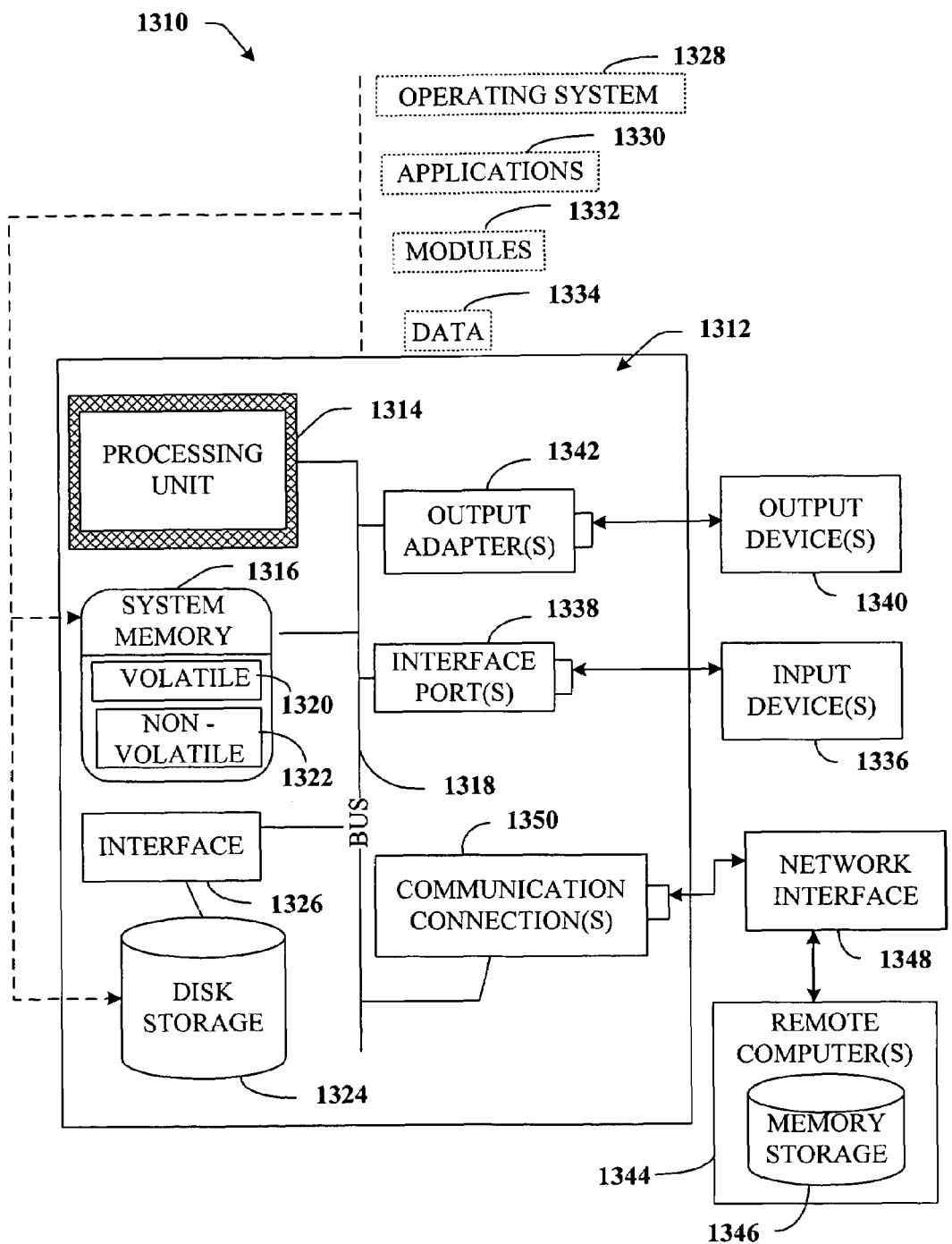
FIG. 13 illustrates an exemplary environment for implementing various aspects of the invention.

In order to provide additional context for various aspects of the invention, FIG. 13 and the following discussion are intended to provide a brief, general description of a suitable operating environment 1310 in which various aspects of the invention may be implemented. While the invention is described in the general context of computer-executable instructions, such as program modules, executed by one or more computers or other devices, those skilled in the art will recognize that the invention can also be implemented in combination with other program modules and/or as a combination of hardware and software.

Generally, however, program modules include routines, programs, objects, components, data structures, etc. that perform particular tasks or implement particular data types. The operating environment 1310 is only one example of a suitable operating environment and is not intended to suggest any limitation as to the scope of use or functionality of the invention. Other well known computer systems, environments, and/or configurations that may be suitable for use with the invention include but are not limited to, personal computers, hand-held or laptop devices, multiprocessor systems, microprocessor-based systems, programmable consumer electronics, network PCs, minicomputers, mainframe computers, distributed computing environments that include the above systems or devices, and the like.

With reference to FIG. 13, an exemplary environment 1310 for implementing various aspects of the invention includes a computer 1312. The computer 1312 includes a processing unit 1314, a system memory 1316, and a system bus 1318. The system bus 1318 couples system components including, but not limited to, the system memory 1316 to the processing unit 1314. The processing unit 1314 can be any of various available processors. Dual microprocessors and other multiprocessor architectures also can be employed as the processing unit 1314.

The system bus 1318 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MCA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1316 includes volatile memory 1320 and nonvolatile memory 1322. The basic input/output system (BIOS), containing the basic routines to transfer information between elements within the computer 1312, such as during start-up, is stored in nonvolatile memory 1322. By way of illustration, and not limitation, nonvolatile memory 1322 can include read only memory (ROM), programmable ROM (PROM), electrically programmable ROM (EPROM), electrically erasable ROM (EEPROM), or flash memory. Volatile memory 1320 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1312 also includes removable/nonremovable, volatile/nonvolatile computer storage media. FIG. 13 illustrates, for example a disk storage 1324. Disk storage 1324 includes, but is not limited to, devices like a magnetic disk drive, floppy disk drive, tape drive, Jaz drive, Zip drive, LS-100 drive, flash memory card, or memory stick. In addition, disk storage 1324 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1324 to the system bus 1318, a removable or non-removable interface is typically used such as interface 1326.

It is to be appreciated that FIG. 13 describes software that acts as an intermediary between users and the basic computer resources described in suitable operating environment 1310. Such software includes an operating system 1328. Operating system 1328, which can be stored on disk storage 1324, acts to control and allocate resources of the computer system 1312. System applications 1330 take advantage of the management of resources by operating system 1328 through program modules 1332 and program data 1334 stored either in system memory 1316 or on disk storage 1324. It is to be appreciated that the invention can be implemented with various operating systems or combinations of operating systems.

A user enters commands or information into the computer 1312 through input device(s) 1336. Input devices 1336 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1314 through the system bus 1318 via interface port(s) 1338. Interface port(s) 1338 include, for example, a serial port, a parallel port, a game port, and a universal serial bus (USB). Output device(s) 1340 use some of the same type of ports as input device(s) 1336. Thus, for example, a USB port may be used to provide input to computer 1312, and to output information from computer 1312 to an output device 1340. Output adapter 1342 is provided to illustrate that there are some output devices 1340 like monitors, speakers, and printers among other output devices 1340 that require special adapters. The output adapters 1342 include, by way of illustration and not limitation, video and sound cards that provide a means of connection between the output device 1340 and the system bus 1318. It should be noted that other devices and/or systems of devices provide both input and output capabilities such as remote computer(s) 1344.

Computer 1312 can operate in a networked environment using logical connections to one or more remote computers, such as remote computer(s) 1344. The remote computer(s) 1344 can be a personal computer, a server, a router, a network PC, a workstation, a microprocessor based appliance, a peer device or other common network node and the like, and typically includes many or all of the elements described relative to computer 1312. For purposes of brevity, only a memory storage device 1346 is illustrated with remote computer(s) 1344. Remote computer(s) 1344 is logically connected to computer 1312 through a network interface 1348 and then physically connected via communication connection 1350. Network interface 1348 encompasses communication networks such as local-area networks (LAN) and wide-area networks (WAN). LAN technologies include Fiber Distributed Data Interface (FDDI), Copper Distributed Data Interface (CDDI), Ethernet/IEEE 1102.3, Token Ring/IEEE 1102.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1350 refers to the hardware/software employed to connect the network interface 1348 to the bus 1318. While communication connection 1350 is shown for illustrative clarity inside computer 1312, it can also be external to computer 1312. The hardware/software necessary for connection to the network interface 1348 includes, for exemplary purposes only, internal and external technologies such as, modems including regular telephone grade modems, cable modems and DSL modems, ISDN adapters, and Ethernet cards.

What has been described above includes examples of the invention. It is, of course, not possible to describe every conceivable combination of components or methodologies for purposes of describing the invention, but one of ordinary skill in the art may recognize that many further combinations and permutations of the invention are possible. Accordingly, the invention is intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A command-based group text messaging system comprising:
   an initiating mobile communication device that creates a message for subsequent broadcast to a recipient group; and
   a communication server that analyzes the message received from the initiating mobile communication device and broadcasts the message to a recipient group;
   wherein the initiating mobile communication device employs any one of a plurality of commands to communicate with the communication server;
   wherein the plurality of commands facilitates creation, management, and removal of users or user-defined groups and communication within a group, via the communication server;
   wherein the communication server is a smart phone that enables group management to be performed directly from the smart phone by hosting user groups and maintaining message logs, the smart phone operates as the communication server for at least one group and belongs to at least one group the communication server hosts; and
   wherein the communication server creates and updates the message logs by storing each message broadcasted per group for later viewing.

2. The system of claim 1, the initiating mobile communication device comprises any one of a mobile phone, a personal digital assistant, and a smart phone.

3. The system of claim 1, the recipient group comprises a plurality of users and their respective mobile communication devices.

4. The system of claim 1, the recipient group comprises the initiating mobile communication device and at least one other mobile communication device.

5. The system of claim 1, further comprising a broadcasting component that broadcasts the message from the communication server to the recipient group.

6. The system of claim 1, the plurality of commands is SMS based.

7. The system of claim 1, further comprising at least one database that is accessible by the communication server to facilitate broadcasting the message to the recipient group.

8. The system of claim 7, the at least one database comprises at least one of the following: user information, group information, and message logs.

9. The system of claim 1, further comprising a group management sub-system that facilitates user maintenance or creation of groups.

10. The system of claim 1 is employed on at least one of a web interface or a mobile communication device interface.

11. The system of claim 1, the recipient group comprises at least one owner of the group that controls communication within or to and from the group.

12. The system of claim 1, further comprising a polling component that identifies at least one of a user's status or a group's status.

13. The system of claim 1, the communication server is serially or wirelessly connected to a group of users, each user having at least one mobile communication device equipped to send or receive text messages.

14. The system of claim 1, further comprising a voice recognition system that detects a user's voice and converts the user's voice to text to facilitate creating a text message on the initiating mobile communication device.

15. The system of claim 1, farther comprising an artificial intelligence component operatively connected to the communication server that associates one or more words in the text message with at least one group and infers the recipient group.

16. A method that facilitates real-time group communication comprising:
   creating a text message on an initiating mobile communication device for subsequent broadcast to a recipient group;
   sending the text message from the initiating mobile communication device to a communication server, wherein the communication server is a smart phone, the smart phone operates as the communication server for at least one group and belongs to at least one group the communication server hosts;
   analyzing the text message received from the initiating mobile device; and broadcasting the text message to the recipient group;
   managing one or more recipient groups at least in part by utilizing a plurality of commands, wherein the plurality of commands facilitates creation, management, and removal of users or user-defined groups and communication within a group, via the communication server;
   enabling group management to be performed directly from the smart phone by hosting user groups and maintaining message logs directly on the smart phone; and
   creating and updating message logs by storing each message broadcasted per group for later viewing.

17. The method of claim 16, analyzing the message comprises determining the recipient group.

18. The method of claim 16 is performed using at least one of a web interface or a mobile communication device interface.

19. A method that facilitates real-time group communication and microcoordination comprising:
   sending a text message to a communication server via at least one access number;
   determining a recipient group of the text message;
   broadcasting the text message from the communication server to the recipient group; and
   managing one or more recipient groups at least in part by utilizing one or more SMS based commands, wherein the SMS based commands facilitate creation, management, and removal of users or user-defined groups and communication within a group, via the communication server, wherein the communication server is a smart phone, the smart phone operates as the communication server for at least one group and belongs to at least one group the communication server hosts;

enabling group management to be performed directly from the smart phone by hosting user groups and maintaining message logs directly on the smart phone; and creating and updating message logs by storing each message broadcasted per group for later viewing.

20. The method of claim 19, determining the recipient group of the text message comprises:

recognizing a group name specified in the message; and accessing one or more databases to locate information about members of the group.

21. The method of claim 19, determining the recipient group of the text message comprises accessing one or more databases for information about a default group selected by message author when no group name is specified in the message.

22. The method of claim 19, determining the recipient group of the text message comprises learning to associate one or more words from the message with at least one group based at least in part upon a user's behavior and inferring the recipient group.

23. The method of claim 19, further comprising at least one of the following:

determining any one of a group status or a member status;

determining any one of a group profile or a member profile;

creating a new group;

adding a new member to a group;

removing an existing member from the group;

modifying group information;

modifying member information;

modifying access rights of a member;

modifying access rights to any one group;

modifying group status;

viewing any group's message log; and joining any group.

24. The method of claim 23 performed at least in part by utilizing one or more SMS based commands.

25. The method of claim 24, further comprising parsing the text message and recognizing at least one command to determine a desired action to be performed.

26. The method of claim 23, wherein modifying group status is performed by at least one group owner.

27. The method of claim 23, wherein modifying access rights to a group is performed by at least one group owner.

28. The method of claim 23, wherein joining a group comprises sending a text message via the communication server to the group requesting membership to the group.

29. A system that facilitates real-time group communication and microcoordination comprising:

means for sending a text message to a communication server via at least one access number;

means for determining a recipient group of the text message;

means for broadcasting the text message from the communication server to the recipient group; and means for managing one or more recipient groups at least in part by utilizing a plurality of SMS based commands, wherein the plurality of SMS based commands facilitate creation, management, and removal of users or user-defined groups and communication within a group, via the communication server, wherein the communication server is a smart phone, the smart phone operates as the communication server for at least one group and belongs to at least one group the communication server hosts;

means for enabling group management to be performed directly from the smart phone by hosting user groups and maintaining message logs directly on the smart phone; and means for creating and updating message logs by storing each message broadcasted per group for later viewing.

* * * * *